US006480844B1

(12) United States Patent
Cortes et al.

(10) Patent No.: US 6,480,844 B1
(45) Date of Patent: Nov. 12, 2002

(54) METHOD FOR INFERRING BEHAVIORAL CHARACTERISTICS BASED ON A LARGE VOLUME OF DATA

(75) Inventors: Corinna Cortes, New York, NY (US); Daryl Pregibon, Summit, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/276,448

(22) Filed: Mar. 25, 1999

Related U.S. Application Data

(60) Provisional application No. 60/079,320, filed on Mar. 25, 1998.

(51) Int. Cl.[7] .............................................. G06F 17/30

(52) U.S. Cl. ...................... 707/5; 379/88.22; 379/88.23; 379/88.25

(58) Field of Search .................. 707/6, 5, 101–104; 379/88.13, 88.03, 900, 901, 906, 907, 266.1, 625.08, 88.22, 88.23, 88.25, 67.7

(56) References Cited

U.S. PATENT DOCUMENTS

| | | | | | |
|---|---|---|---|---|---|
| 6,108,658 | A | * | 8/2000 | Lindsay et al. | 707/101 |
| 6,119,103 | A | * | 9/2000 | Basch et al. | 705/35 |
| 6,173,280 | B1 | * | 1/2001 | Ramkumar et al. | 707/6 |
| 6,185,559 | B1 | * | 2/2001 | Brin et al. | 707/6 |
| 6,188,751 | B1 | * | 2/2001 | Scherer | 379/88.22 |
| 6,240,411 | B1 | * | 5/2001 | Thearling | 707/5 |

OTHER PUBLICATIONS

Statistical Inference and Data Mining, Glymour et al., Communications of the ACM, vol. 39, No. 11, (Nov. 1996(35–41.*

* cited by examiner

Primary Examiner—Kim Vu
Assistant Examiner—Tam V Nguyen
(74) Attorney, Agent, or Firm—Kenyon & Kenyon

(57) ABSTRACT

A method provides for mining information from large volumes of data regarding transactions. The method provides for inferring a behavioral characteristic of a party to the transaction based on a large volume of data concerning a multitude of parties. That inferred characteristic may be dynamic in nature.

14 Claims, 4 Drawing Sheets

METHOD FOR INFERRING BEHAVIORAL CHARACTERISTICS BASED ON A LARGE VOLUME OF DATA

CROSS REFERENCE TO RELATED APPLICATION

This application is related to and claims priority from provisional application No. 60/079,320 entitled TELECOMMUNICATIONS DATA MINING, filed Mar. 25, 1998, the disclosure of which is hereby incorporated by reference.

BACKGROUND

The present invention relates to extracting information from large data sets. More specifically, the present invention relates to a method for inferring behavioral characteristics of an individual entity based on a large volume of data about a multitude of entities.

Data mining is the name given to the process of extracting information from large data sets. It is a multi-disciplinary field that brings together the latest technology and research in database design, exploratory data analysis, algorithms for very large data sets, model fitting, visualization and systems.

Many will claim that data mining is nothing new. Database systems have been around for decades. Also, and for centuries, scientists have studied data sets for correlations and dependencies between the elements. They have developed models to describe data and invented ways of displaying both the data and the models.

However, data mining differs from "traditional" data analysis on one single, but important dimension: scale. The size of data sets has grown tremendously with modern computers and data storage capabilities. Ten years ago a large data set would consist of thousands of observations/cases stored in 10 MB. Today, a large data set consists of millions of cases stored in 10 GB. The size and complexity of the available data is often so overwhelming that most algorithms from machine learning, statistics, and visualization become impossible to use in practice. An important problem in data mining is to determine how to scale these algorithms. This problem is referred to in "Statistical Inference and Data Mining", Glymour et al., Communications of the ACM, Vol. 39, No. 11 (Nov. 1996) 35–41 and "External Memory Graph Algorithms", Chiang et al., ACM-SIAM Symposium on Discrete Algorithms, 1996.

Large data sets are ubiquitous in science, technology, and the commercial sector as described in "Mining Business Databases", Brachman et al., Communications of the ACM, Vol. 39, No. 11 (November 1996) 42–48; "Citibank Mines Data", Information Week, No. 600 (October 1996), and "A Collaborative Filter Can Help You Mine Data For Jewels", InfoWorld, Vol. 18, No. 49 (December 1996), 47. For ease of reference and explanation, the commercial sector is addressed since this is where the inventors' recent experience lies. Here, the data sets may be the result of credit card transactions, retail sales, or calls carried by a phone company. In a highly competitive marketplace these data sets are an extremely valuable asset. From these data, businesses can learn who their customers are, where they are, what their needs are, how they use existing services and products, what makes customers stop using or buying the offered services and product, and what offers could attract new customers. Businesses that do not have a method for efficient recording, handling, and analyzing data are at a serious competitive disadvantage. Thus, data mining is more than a research area, it is a commercial need.

Unfortunately, often times since the number of commercial transactions is fairly voluminous, the amount of data recorded per transaction is somewhat limited. Thus accounting—like information might be retained for each transaction. But, it would be beneficial if further information about a transaction or the participants to the transaction could be gleaned from this data set.

SUMMARY OF THE INVENTION

The present invention provides techniques and methods for performing meaningful mining of gigabytes of data. In accordance with the present invention, a volume of data relating to a multitude of transactions is maintained. The volume of data is analyzed to determine inferences about characteristics of the entities or parties conducting the transactions.

Making inferences from data has been a long tradition in the field of statistics. The present invention provides the ability to make inferences from data when the size of the data set precludes conventional analyses. Data streams may comprise transaction records (transactions) that capture the salient details of a transaction between two entities. Examples of types of transactions to which the present invention can be applied include such things as credit card purchases; telephone call records, packet headers in data communications; and stock transactions.

The present invention further provides the ability to make inferences pertaining to dynamic behaviors.

In one embodiment of the invention provided to illustrated the principles of the present invention the transactions are calls along a communication network. Billing records for the calls are maintained. Characteristics about individual calling or called parties can be inferred from the billing records. Examples of such characteristics include the likelihood that the party is a business or a resident, the likelihood that the communication is a facsimile transmission, the likelihood that the communication is somehow fraudulent in nature or other similar types of characteristics about calls, or calling and/or called parties.

DETAILED DESCRIPTION

Overview

Figure 1:
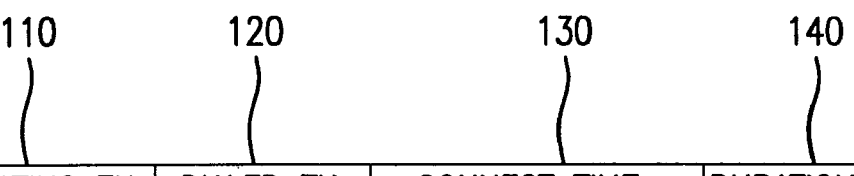
FIG. 1 illustrates, in tabular form, an example of a transaction record which could be used in an embodiment of the present invention.

The present invention provides a method by which data is mined or extracted from large data volumes or sets. In the present invention it is recognized that a large volume of transaction data can contain information about the parties engaging in the transactions or the nature of the transactions themselves. The present invention examines the volume of data to ascertain whether correlations exist between particular pieces of the data and particular types of transactions or transaction parties. Once a model or set of rules is established based on this analysis, the model or set of rules can be applied to the individual parties to examine their behavior in relationship to these rules and to classify these parties accordingly. This process can be referred to as making inferences about the parties or the underlying transactions.

Making inferences from data has a long tradition in the field of statistics. The unique perspective in the present invention concerns an instance of making inferences from data when the size of the data set precludes conventional analyses. In particular, the number of records can essentially be thought of as being infinite, since they occur continuously through time. The discussion is limited to data streams that consist of transaction records (or simply transactions) often on the order of 10 million per hour. A transaction can be constituted by a very simple record capturing the salient details of a transaction between two entities. Examples (but not the only possible types) of transactions include:

a) credit card purchases (in retail industries);

b) telephone call records (in voice communications);

c) packet headers (in data communications); and d) stock transactions (in banking and finance).

Typically the salient details consist of:

1) the originator of the transaction;

2) the recipient of the transaction;

3) the date of the transaction;

4) the time (of day) of the transaction; and 5) the "size/value" of the transaction.

The present invention provides for making inferences about all originators and recipients that conduct transactions. As relates to a)–d) above this translates to:

a') all card numbers and all merchant IDs;

b') all telephone numbers;

c') all IP (internet protocol) addresses; and d') all investor IDs and publicly traded corporations.

Inferences about all entities are conventionally accomplished by accumulating all the data and applying statistical or other techniques. In the case of transactional data streams this is not possible owing to the size of the data and the fact that the data set continually changes through time. In this regard a distinction can be made as to what size "learning increment" is used. The present invention applies to "learning increments" that include:

i) processing single transactions as they arrive (termed event-driven processing); or ii) accumulating transactions over some time period and processing them in a batch (termed time-driven processing).

It is worth noting that the conventional methods pertain to processing model ii) where the "batch" includes all of the transactions and they are processed in toto.

Most often, a particular application for the inferences dictates the relevant "learning increment". For example, fraud detection or network intrusion detection requires event-driven processing since immediate detection is necessary. By contrast, marketing and service management applications suggest daily/weekly time-driven processing cycles.

The accuracy and rate of inference is affected by the processing time cycle: behaviors that are easy to infer over a first time period might be extremely difficult to infer over a second, shorter, time period.

Clearly, processing time is also an important constraint in choosing the appropriate cycle time for incremental inferences since the time it takes to process a group of transactions has to be less than the cycle time (for example, it must take less than 24 hours to process a day's worth of transactions). The types of inferences that can be made from transactional data streams depend critically on the extent to which statistical patterns of certain characteristics are exhibited in the data stream. The present invention applies to cases where such statistical patterns exist. But the patterns need not be direct measures of the attribute that is being inferred. That is, individual transactions provide only indirect evidence of some behavior that is of interest. For example, one can infer "wealth" by observing credit card transactions even though individual records contain no information on the wealth of the card number because collections of such records over time and the statistical property or properties of card numbers associated with wealthy individuals allows reasonable inferences to be made over time.

Finally, the present invention pertains to behaviors that are dynamic—that is, that change through time. In the previous example, the "wealth" of a particular card number is not expected to be constant (for example, as earning power increases, spending does as well). It is usually of interest that inferences be current, so that they reflect behavior today, not from the more distant past.

The remainder of this application will describe the application of the principles of the present invention to one of the example transactions referred to above, the area of telephone call/communication transactions. The techniques for mining data in the telephone call transaction area can be readily adapted to these other types of transactions.

Transaction Characteristics

Depending on the types of transactions being monitored, different characteristics about the transactions and/or the transaction parties may be of interest.

Looking at telephone calls as an example of transactions, a single service provider may participate in a multitude of transactions.

For example, AT&T is probably the largest phone company in the world. It carries about 250 million (M) calls on a weekday—less over the weekend. The total number of calls reported for 1997 was 72 billion. On a typical weekday 65 M unique phone numbers are observed by AT&T. These numbers include those of calling parties as well as called parties. Over a 40 day period 300 M unique numbers may be observed.

Call records are generated with respect to each of these transactions or calls. An example of call detail records is illustrated in FIG. 1. In table form are shown records for each processed call, showing the telephone number (TN) of the originating party (100), the dialed telephone number (120), the time the connection was made (130), and the duration of the connection (140). It would be beneficial if further information about a given party, as represented by a telephone number, could be derived based on data relating to that party as compared to the universe of data relating to all calls and call parties.

A universe list is a list of unique telephone numbers (TNs) observed on the network, together with a few bytes of information on each to support operations such as billing, customer care, usage management, and fraud detection and prevention. In accordance with an embodiment of the present invention, at least four distinct variables can be monitored through time.

inactivity: the number of days since the number was last observed on the network.

minutes: the average daily number of minutes a TN is observed on the network, frequency: the estimated number of days between observing a TN, bizocity: the degree to which a TN displays business-like behavior.

These variables may be maintained separately for inbound calling and outbound calling, and in some cases, distinctions can be made for toll and toll-free calls.

The inactivity variable may be determined by simply incrementing values in a data structure according to the expression:

$$INACTIVITY(TN)_{new} = \begin{cases} 0 & \text{if observed today} \\ INACTIVITY(TN)_{old} + 1 & \text{if not observed today} \end{cases} \quad (1)$$

That is, if the telephone number (TN) is observed today then the inactivity variable is re-initialized; if the TN is not observed then the prior inactivity variable is incremented by one.

The basic statistical device used for tracking the other three variables is an exponential weighted average. This strategy is typical in tracking large numbers of entities with even larger numbers of transactions. For example, letting $0<\lambda<1$, the expression:

$$MINUTES(TN)_{new} = \lambda MINUTES(TN)_{today} + (1-\lambda)MINUTES(TN)_{old} \quad (2)$$

illustrates how today's minutes for a TN are combined with the old average daily minutes to provide a smooth current estimate of average daily minutes. Similar computations are made for "frequency" and "bizocity".

This is the main principle behind the universe list, namely using old and current information about a party, as well as information from the entire data set, to better describe characteristics of that party.

The universe list is based both on appropriate statistical modeling, and an efficient computational approach. Subsequent sections, present a statistical method for use; the need and the method for monitoring a bizocity score (bizocity is an interesting behavioral factor that requires challenging statistical modeling and tracking methods); a computational engine necessary to maintain a call detail stream and to update data structures (a careful design of the data structures is of critical importance: when processing hundreds of millions of calls per day, the I/O processes might tend to dominate the CPU time, and thus considerably slow down the whole processing); a description of an interface to data mining results. It helps to give a convenient access to the data, and to make testing possible when the size of the data exceeds several gigabytes.

Bizocity and Its Modeling

One natural piece of information that AT&T is interested in is whether a phone number belongs to a business (Biz) or a residential (Res) customer. Historically, the company has split its operations along the Biz/Res boundary for billing, customer care and marketing. So, it is naturally desirable to infer Biz/Res status of any TN observed on the network to aid internal operations. For example, when a call comes into an AT&T customer care center, knowledge of the Biz/Res status of the calling party allows the call to be automatically routed to the appropriate care channel. This is an efficient use of the channel and a convenience to the calling party. Similarly, fast, efficient investigation of telephone fraud requires knowledge of the Biz/Res status of the involved lines. For example, long calls originate quite commonly from residences late at night, but not from a business. Thus, a long call from a business at night may be an indicator of an instance of fraud.

For about 100 M of the 300 M lines seen on the network, the self-reported Biz/Res status is known: when a customer signs up for phone service with the local phone company, they specify their status as either business or residence. If the customer chooses AT&T as their long distance service provider, this information is usually passed on to AT&T. Feeds of information from the local phone companies may be incomplete (e.g., a business may have its central number listed as a business, but may not also identify all of their additional lines). The information can also be out of date (e.g., the feeds may arrive much later than the date the customer starts using AT&T long distance service). Additionally, a customer may change his or her usage of a line such as for example changing a residential line to a line used for home business purposes. Such information is of course not normally conveyed to AT&T.

The universe list solves the problem of the missing Biz/Res status for the remaining 200 M lines (or ⅔ of all lines seen) by deriving and maintaining a behavioral estimate of the Biz/Res status of all TNs observed on the network over some predetermined period of time (e.g., the most recent 40 days). This behavioral estimate is referred to as the bizocity score of a telephone number. Bizocity then is a probablistic measure of how much a line behaves like a business. It is constructed from characteristics of the calls going into or out of each line. The bizocity of a line may very well be different from the self-reported Biz/Res status. This will be the case for example when a residential line is used for a home business. Thus, while it is not possible to derive what a customer might have actually told their local phone company when signing up for service, based on the behavior of the line over time it is possible to derive a very good guess of the line's status.

The methodology of the present invention estimates the bizocity of a phone number by tracking the behavior of the line over time. Each day all lines with calling activity can be scored for how business-like they behave that day. This score is combined with the bizocity score from past history of the line to form a new bizocity score. These new scores are stored for next day's processing. Alternatively, one could use a larger time interval for determining bizocity. For example, rather than updating such scores on a daily basis it could be done on a weekly basis or on some other time period. This would likely increase the data to be used for score adjustment and may provide a smoother measure of the characteristic.

As indicated above, a basic building block for the universe list is a call detail record generated at call completion. Most of the fields in the record relate to how the call is routed on the network. Only a few fields contain useful information for bizocity modeling. A small sample of call detail records is shown in the table of FIG. 1. It is apparent that these records do not provide customer identification, only pairs of phone numbers: they have the originating TN, the dialed TN, the connect time, and the duration of the call. For credit card and collect calling, other fields can identify the billing number. While such calls may have some impact for bizocity scoring, it is believed that effective information can be derived without referenced to such credit card and collect calling calls.

It is possible to add value to the plain call detail records by dipping into other available data bases. As described above, for about 100 M TNs there is information available about the self-reported Biz/Res status so it is possible to add two fields to each call detail record, one that identifies the Biz/Res status of the originating and another that identifies the Biz/Res status of the dialed TN. This database also enables us to construct a training set to learn calling behavior. Using the training data we illustrate the (statistical) signal on bizocity in call detail.

Figure 2:
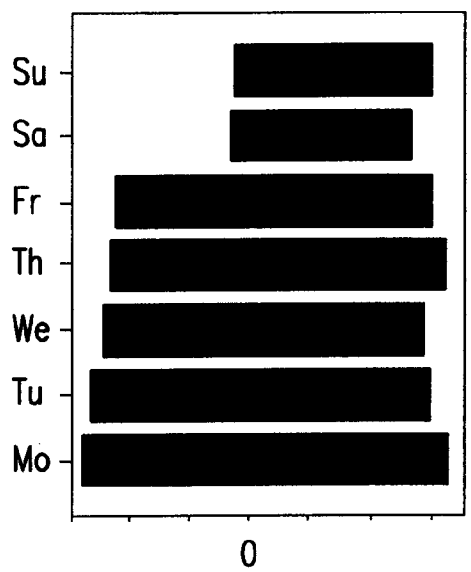
FIG. 2 illustrates historical information used in connection with an embodiment of the present invention.
Figure 2:
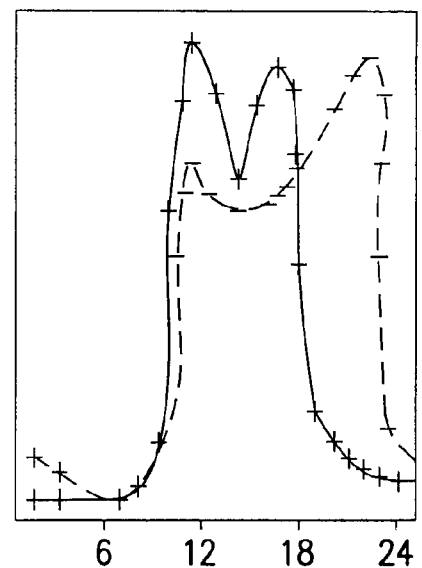
Figure 2:
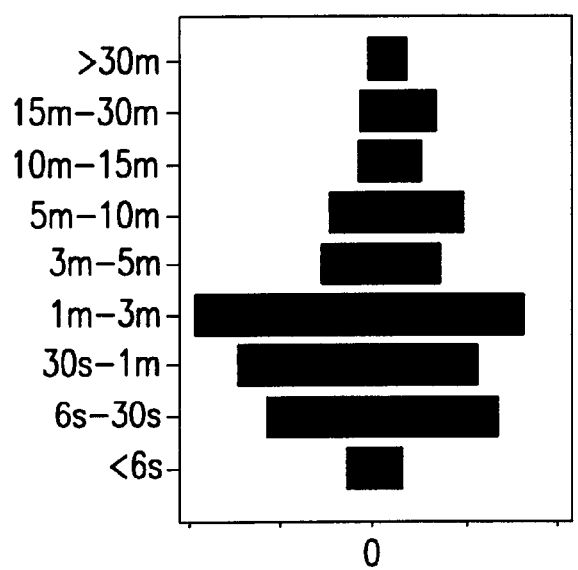
Figure 2:
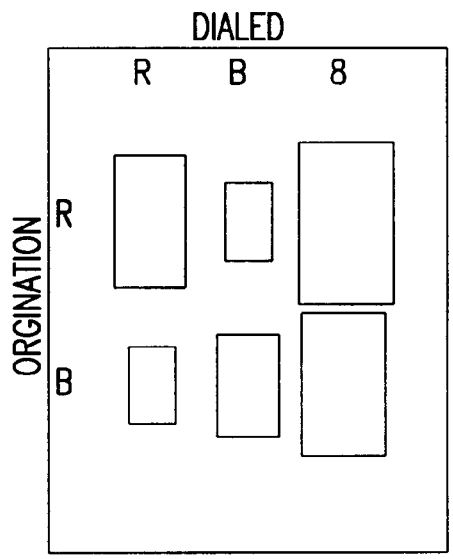

FIG. 2 illustrates how businesses and residential customers make different use of the telephone. Businesses call during the week, but hardly ever over the weekend. Businesses call from 9AM–5 PM with a lunch break, while the peak for residential customers' calling is in the evening. Businesses make short calls, and they call other businesses or 800 services. FIG. 2 shows that while individual call detail records may be very simple and very noisy, this simplicity and noise can be overcome by sheer volume: from aggregation it is possible to obtain lots of information for differentiating businesses from residences.

The statistical patterns in FIG. 2 are aggregated over all known Biz/Res TNs for a typical week of calling. If one studies a single call from a TN one gets a much weaker piece of information. For instance, it is not possible to derive much information for a TN based on a single three minute call on a weekday afternoon. But by staging processing and aggregating calls, bizocity scoring of individual TNs can be significantly enhanced.

Processing can be staged over a 24 hour period. This serves the purposes of collecting more data (and hence getting a better signal from a single TN), and reducing the I/O burden on call processing. Recall that on a typical day the AT&T network carries 250 M calls but that only 65 M unique TNS are involved. Therefore, processing call detail every 24 hours can reduce the I/O by 75%. The flip side of staging the processing is that it is necessary to store 24 hours of data, and then sort it so that all the calls from a single TN can be processed together. Storage is a minor problem: disks are cheap and records can be compressed in an efficient manner. Specifically, it is possible to translate individual ASCII records to 32 byte binary records so that a day of call detail occupies a total of about 8 GB. Sorting is done directly from these binary records. It takes about 30 minutes on an SGI Challenge with 3GB RAM using a single processor.

Once all the calls from a single TN are gathered, its calling profile is formed by binning its calls into a four dimensional array, e.g., a data cube. The dimensions are day-of-week, time-of-day, duration, and Biz/Res/800 status of the detailed TN. The size of the entire cube is 7×3×4×3×65 M.

Figure 3:
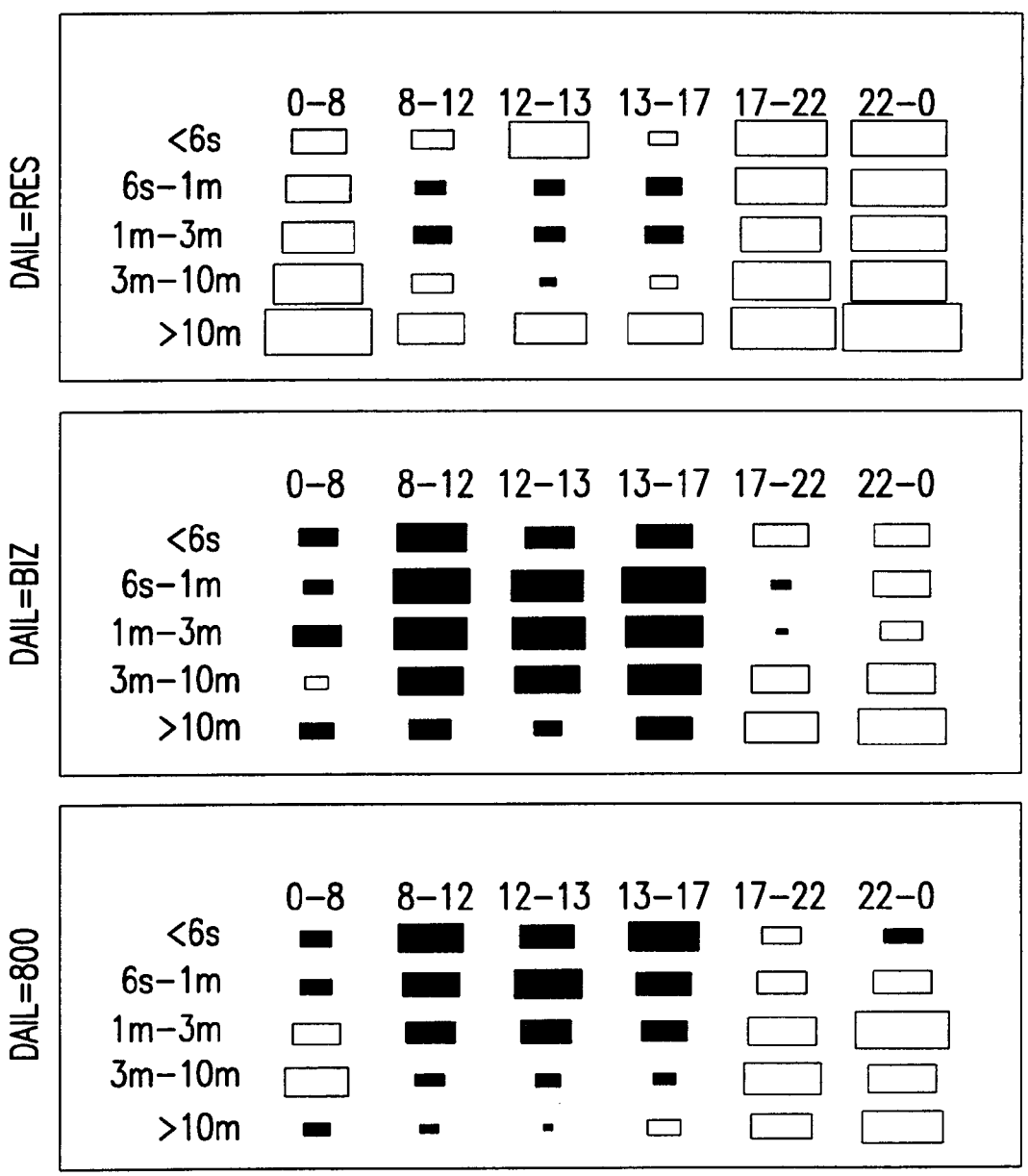
FIG. 3 illustrates coefficients for use in a model in an embodiment of the present invention.

From training data collected on known businesses and residences it is possible to form logistic regression models for scoring a TN based on its calling profile. Logistic regression seems to do a reasonable job at this two group classification, but due to the near-rank deficiency of the binned data, regularization via a "ridge" penalty is necessitated. An advantage of logistic regression is that it leads to easily interpretable models. The coefficients of one of these models are shown in FIG. 3. It shows how long calls in the evening contribute towards scoring a TN as a residence while short calls in the middle of the day favor a business-like behavior.

The models are then used on the calling profile for the single TN to estimate today's business-like behavior of that TN. This is done for all TNs engaged in calling activity in that update period (here one day). Using just today's calls as a bizocity score would give a noisy picture of a TN. Therefore, it is more appropriate to track the TNs and smoothly aggregate their daily scores. The bizocity score of a TN, BIZ(TN), can then be updated using an exponential weighting as previously mentioned:

$$BIZ(TN)_{new} = \lambda BIZ(TN)_{today} + (1-\lambda)BIZ(TN)_{old} \quad (3)$$

where $0<\lambda<1$. The "aging" factor $\lambda$ is adjusted as a trade-off between smooth scoring of a TN (small $\lambda$) and fast tracking in changes in behavioral pattern of a TN (large $\lambda$). With a reasonably small $\lambda$, the new bizocity score can contain weeks of historic information about TNs without storing more than one set of scores.

If a TN does not have any calling activity, its bizocity is also updated using Equation (3). From training data of known business and residential customers, its probabilities of how likely a TN is to be a business given that it makes no calls on a weekday or over a weekend have been estimated.

One interesting and important aspect of the universe list is that the bizocity scores are self-consistent and self-maintaining. Recall that in off-line training data, the calling profile of a TN is formed by binning new calls with respect to the Biz/Res/800 status of the dialed TN. But for on-line production scoring, the self-reported status for ⅔ of the TNs is not available. This deficiency is overcome by utilizing the bizocity score for the dialed TNs, $BIZ(DIAL-TN)_{old}$, even when the self-reported status of the dialed TN is known. So, for example, a call will be dialed to a TN that is a Biz with probability 0.7 and a Res with probability 0.3. The calling profile of a TN is the array of all these probabilities, and the new bizocity score of the TN, $BIZ(TN)_{today}$ is computed from the old bizocity scores:

$$BIZ(TN)_{today} = f(\text{profile}(TN, BIZ(DIAL-TN)_{old}))$$

were f is the logistic regression model estimated off-line. The universe list has been running in this fully autonomous mode for more than a year and we still observe fine separability of Biz and Res lines: is still observed the bizocity scores have not collapsed into a single value.

The accuracy of bizocity scoring is hard to assess since a TN may very well behave differently from what it officially is registered as. This will be the case for example when a pure residential line migrates to home business use. Accuracy for predicting the official labeling of a TN has been shown to be 75%.

Having described the process of modeling and detecting a given characteristic such as bizocity, it may be beneficial to consider a generalized description of the process.

First, the process obtains a sample of labeled entities relating to the behavior or characteristic under study. Normally this sample would not be drawn from the transaction stream itself but rather from some auxiliary corporate database. The sample should consist of N ordered pairs (entity-id, entity-value).

The entity-id's are used in the second step. The entity-value is normally binary indicating whether or not the entity exhibits the behavior or not. In other cases the value can take on values on a nominal (e.g., red/green/blue), ordinal (e.g. low/medium/high), or a measurement (e.g., $130,000/yr) scale.

Second, the process extracts (from the data stream) a sequence of transactions (over time) corresponding to the entity-ids. The length of the sequence is dictated by the behavior under study and the available resource for analysis.

Third, the process identifies features in the data stream that characterize, in a statistical sense, the behavior under study. The selected features will usually determine, or be determined by, the processing cycle. For example, if the best feature to characterize wealth of a credit card holder is the ratio of weekend purchases to weekday purchases, then the processing cycle cannot be sub-weekly. One or more of the salient fields of the transaction records could make up the feature set. Call these features the entity-features.

Fourth, the process builds a model to predict the entity-value from the entity-features. Depending on the type of entity-value at hand, the prediction model could be based on linear regression, logistic regression, decision trees, neural nets, or similar linear/nonlinear modeling technique.

Computational Issues

The universe list is a particular embodiment of the present invention that requires serious hardware and robust, efficient software. Call detail records are stored in 32 byte binary records. At no point in the processing is ASCII conversion performed. Highly efficient programs work directly on the binary records. For example, sorting 250 M records can be accomplished in about 30 minutes (recall that records need to be sorted two ways since TNs are being scored based both on calls into and out of them). A set of tools have been developed for operating on the binary records to support filtering and tabulation.

Figure 4:
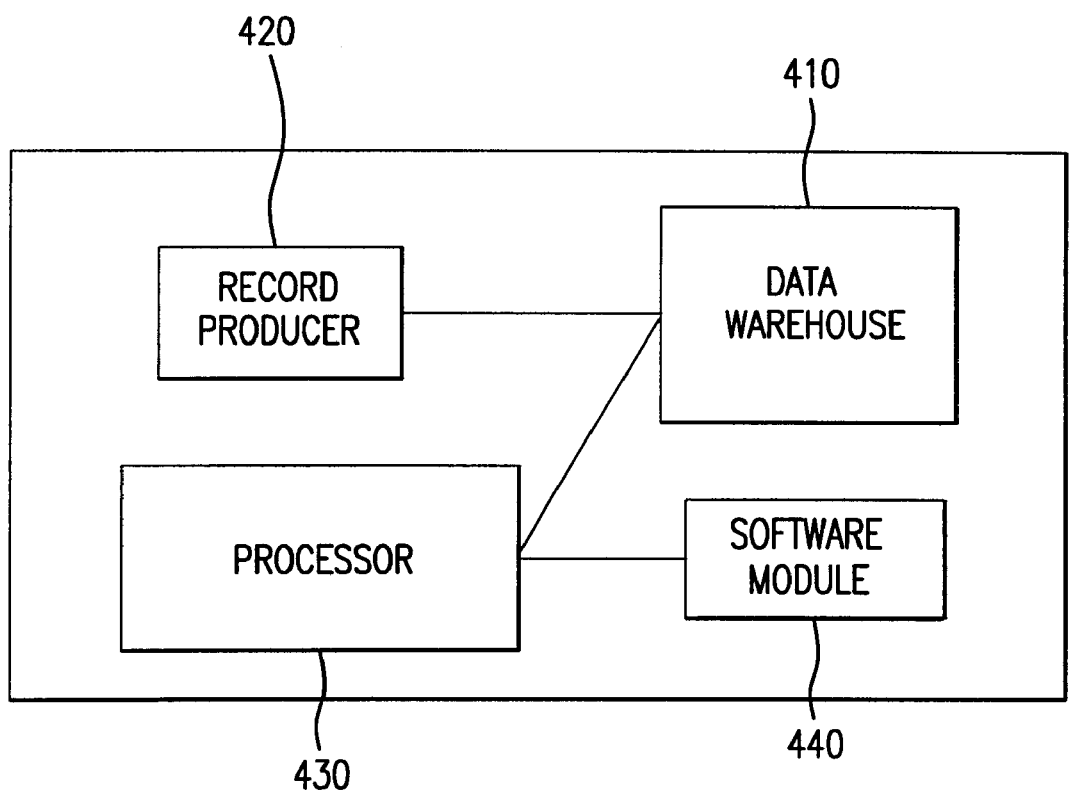
FIG. 4 illustrates, in block diagram form a representation of an apparatus for performing a method in accordance with an embodiment of the present invention.

FIG. 4 illustrates in block diagram form, a data mining platform on which the present invention can be executed. The platform includes a data warehouse, 410 that stores the various transaction records. It further includes a record producer 420 that receives the raw data stream and creates the records to be stored in the warehouse. A processor 430 executes software from module 440 to perform the analysis of the records in the data warehouse in accordance with the processes described above.

The universe list embodiment may be implemented in C. In a couple of hours it makes two passes over the data, first to score each TN seen with outbound calling, then to score each TN seen with inbound calling. This processing is done on the platform which can include an SGI Challenge with 20 processors, 3 GB RAM, and 5 GB of swap space. As one would expect when discussing large volumes of data, a several terabyte disk farm is maintained.

The scores are stored in special purpose data structures that allow for fast sequential and fast random access. These data structures reflect the semantics of 10 digit telephone numbers into the exchange (first 6 digits) and line (last 4 digits). First, they exploit the fact that the space of exchanges is sparsely populated—only 150,000 of the possible 1 M exchanges are currently in use. Second, we exploit the fact that exchanges in use are often densely populated is exploited, so all 10,000 possible line numbers for an exchange are stored in a contiguous block whether or not the exchange is actually fully populated. Inbound/outbound scores for a TN are quantized into one byte, so the data structures can take up about 2 GB for each variable (score). This is much more than is minimally required since a lower bound for the space required is one byte for a TN and one byte for the score, suggesting a 600 MB data structure. This smaller data structure was initially considered, but migration to the other structure was provided for fast random access. The data structure also deals effortlessly with growth within an exchange, and quite simply with area code splits.

Besides the three inbound/outbound measurement variables that are maintained for each TN, maintain activity maps for all TNs are maintained. Also, the method keeps track of how many days calling activity has not been seen on a TN inbound, outbound, or to 800-numbers. The upper bound for the number of passive days is 40. This allows packing the three activity values for the single TN into two bytes. The size of the activity maps is about 4 GB, so it is necessary to use 64-bit programming and to run our programs on 64-bit machines.

Interface

Implicitly, the above methodology for call transaction analysis involves estimating several hundred million parameters per day. How can one explore such a huge parameter space and ensure that the algorithm is doing the "right thing"? The approach of this particular embodiment of the present invention exploits the fact that TNs are aggregated at several levels of a natural hierarchy:

bank: the group of 100 TNs that share the first 8 digits of the TN, exchange: the group of 10000 TNs that share the first 6 digits of the TN, area code: the group of (<10 M) TNs that share the first 3 digits of the TN, state: the group of TNS that reside in the same state (i.e., a group of area codes), region: the group of TNS that reside in the same region of the country (i.e., a group of states).

Similarly, in other types of transactions it is possible to take advantage of any natural hierarchy with regard to entity identifiers.

The data available can be made available at all these levels through a variety of visualization tools. In effect, the tools are designed to be used in a top-down fashion whereby one starts at the highest level of the hierarchy. As more detail is required, the user is able to "drill-down" and check results at a finer level. Depending on the application, information at the TN level is provided. For example, corporate security applications require direct access to a random-access data warehouse of call records.

For interactive use, it is possible to employ a web browser such as Netscape Navigator or Microsoft's Internet Explorer as the user interface. This has proven quite effective in disseminating the results to a broad community of users and platforms over a corporate intranet. The user can, with a few clicks, display scores for a full exchange and effectively drill down to the single TN level. The universe list contains about 150,000 exchanges so all images have to be computed on-the-fly. Snappy performance and rapid response is guaranteed by the special purpose data structures and C-code that directly computes images in GIF format.

Conclusion

A universe list in the telecommunications call processing environment proves that it is indeed possible to do meaningful mining of gigabytes of data. The universe list has now been running uninterruptedly for more than a year, every day updating 7 bytes of information on every TN with calling activity. Over this year, the universe list has demonstrated how it is possible to establish and effectively maintain short, yet powerful, behavioral profiles on millions of telephone numbers through tracking of simple features.

The bizocity score described in this paper relates to a classification task: statistical models are used to categorize telephone numbers as business or residential lines. Another interesting task is that of capturing deviations: new transactions are compared to the existing profile of the telephone number, and large deviations are flagged for further investigation. This is methodology which can be used to catch international calling fraud.

While our experience is with call detail data from the AT&T network, the methods for tracking simple profiles described in this paper can, of course, be applied to other very large transactional data set such as airline reservations, credit card usage, and web-access. More specifically such large data sets, comprising primitive transaction records individually representing limited pieces of information, can be used to create models about characteristics concerning the transaction participants. Then, data concerning any one of these transaction participants can be analyzed with reference to the models to infer one or more characteristics of the participant.

What is claimed is:

1. A method for inferring a behavioral characteristic of an entity from a large volume of multi-entity transaction data, comprising:

extracting N ordered pairs from a telephone number database, the N ordered pairs having a telephone number and a business status value indicating whether the telephone number belongs to a business;

storing transaction data including a plurality of call detail records, each of said records having an originating telephone number, a dialed telephone number, a connect time and a duration;

extracting a first sequence of transactions corresponding to the N ordered pair telephone numbers from the transaction data;

identifying a plurality of features indicative of the business status value within the first sequence of transactions;

building a model to predict the business status value from the features;

extracting a second sequence of transactions corresponding to a telephone number of an entity from the transaction data;

predicting a business status value for the entity using the model and the second sequence of transactions; and inferring whether the entity is a business from the predicted business status value.

2. The method of claim 1 further comprising:

analyzing a subsequent set of call detail records using the model;

determining a revised probability that the entity is a business based on the analysis of said subsequent set of call detail records and an earlier determined probability.

3. The method of claim 2, wherein said building the model includes processing staging and call aggregation.

4. The method of claim 3, wherein said processing staging occurs over a 24 hour period.

5. The method of claim 1, further comprising:

forming a calling profile for each originating telephone number by binning the call detail records associated with the originating telephone number into a four-dimensional data array.

6. The method of claim 5, wherein said data array includes a day-of-week dimension, a time-of-day dimension, a duration dimension, and a status dimension.

7. The method of claim 1, wherein said model is formed using logistic regression techniques.

8. The method of claim 7, wherein said model is regularized using a ridge penalty.

9. The method of claim 1, wherein said building the model occurs over an update period.

10. The method of claim 9, wherein said update period is one day.

11. The method of claim 2, wherein said determining a revised probability includes updating the earlier determined probability based on exponential weighting and an aging factor.

12. The method of claim 1, wherein said model is based on linear regression.

13. The method of claim 1, wherein said model is based on decision trees.

14. The method of claim 1, wherein said model is based on neural nets.

* * * * *